(12) United States Patent
Helgesen

(10) Patent No.: US 7,420,923 B2
(45) Date of Patent: Sep. 2, 2008

(54) OPTIMIZING SOFTWARE DISTRIBUTION IN LARGE COMMUNICATION NETWORKS

(75) Inventor: Jan Ingvard Helgesen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 792 days.

(21) Appl. No.: 10/471,416

(22) PCT Filed: Mar. 12, 2002

(86) PCT No.: PCT/NO02/00101

§ 371 (c)(1),
(2), (4) Date: Nov. 19, 2003

(87) PCT Pub. No.: WO02/073659

PCT Pub. Date: Sep. 19, 2002

(65) Prior Publication Data

US 2004/0213159 A1    Oct. 28, 2004

(30) Foreign Application Priority Data

Mar. 13, 2001    (NO) .................................. 20011273

(51) Int. Cl.
*H04L 12/28* (2006.01)
(52) U.S. Cl. .................... 370/238; 370/400; 709/238
(58) Field of Classification Search ................ 370/238, 370/400; 709/238, 241, 242
See application file for complete search history.

(56) References Cited

U.S. PATENT DOCUMENTS

| | | | |
|---|---|---|---|
| 5,430,729 A | | 7/1995 | Rahnema |
| 6,023,586 A | * | 2/2000 | Gaisford et al. ............. 717/178 |
| 6,088,333 A | * | 7/2000 | Yang et al. .................. 370/238 |
| 6,289,021 B1 | * | 9/2001 | Hesse ......................... 370/409 |
| 6,771,604 B1 | * | 8/2004 | Dommety et al. ........... 370/238 |
| 6,813,272 B1 | * | 11/2004 | An et al. .................. 370/395.21 |
| 2002/0006112 A1 | * | 1/2002 | Jaber et al. ................. 370/238 |

FOREIGN PATENT DOCUMENTS

| | | |
|---|---|---|
| EP | 0766430 A2 | 4/1997 |
| EP | 1014652 A2 | 6/2000 |
| EP | 1 014 652 | 7/2000 |
| EP | 1107113 A2 | 6/2001 |
| WO | WO 00/19291 | 4/2000 |

OTHER PUBLICATIONS

Sahasrabuddhe et al., Multicast Routing Algorithms and Protocols: A Tutorial, Jan./Feb. 2000, IEEE Network, pp. 90-102.

(Continued)

*Primary Examiner*—Min Jung
(74) *Attorney, Agent, or Firm*—Nixon & Vanderhye P.C.

(57) ABSTRACT

The present invention is related to optimizing software distribution in large communication networks (e.g. UMTS). A distribution graph including the nodes involved in the distribution spanned out by logical links assigned cost values is constructed. On basis of the distribution graph, the shortest paths from the distribution node (e.g. an OMC) to each of the other nodes (e.g. BSC, SGSN, RBS) are calculated. These paths are placed in groups of overlapping paths. The paths in each group are then ordered according to the number of nodes in each path, wherein the path with the lowest number of nodes is placed first. Then the software distribution is executed in each group, starting by loading the software from the first to the second node of the first ordered path, then the same is done for the second ordered path, and so on, but the loading between the same two nodes is not taking place more than once even if they appear as the first and the second node in more than one path. After reaching the last ordered path, the first node of each path in the group is removed. These loading and removing steps are repeated until all the nodes in the group are provided with the software.

11 Claims, 4 Drawing Sheets

OTHER PUBLICATIONS

Design Implementation Guide, Multicast Deployment Made Easy, IP Multicast Planning and Deployment Guide, pp. 1-20.

John Chung, Pricing Multicast Communication: A Cost-Based Approach, pp. 1-16.

Introduction to IP Multicast Routing, An IP Multicast Initiative White Paper, pp. 1-13.

J. Moy, RFC1585, MOSPF: Analysis and Experience, Mar. 1994, pp. 1-10.

J. Moy, RFC1245, OSPF Protocol Analysis, Jul. 1991, pp. 1-9.

International Search Report.

International Preliminary Examination Report dated Feb. 2, 2003.

Communication issued in European Application No. 02 703 997. 3—2211 dated Dec. 12, 2007.

E.W. Dijkstra, "A Note on Two Problems in Connexion with Graphs", Numerische Mathematik, vol. 1, pp. 269-271, Dec. 1959.

T. H. Cormen, et al., "Introduction to Algorithms", The MIT Press, 1989.

J. Postal, et al., RFC0959 File Transfer Protocol, Updated by RFC2228 and RFC2640, Oct. 1985.

J. Moy, RFC2328 OSPF Version 2, Apr. 1998.

S. Deering, RFC1256 ICMP Router Discovery Messages, Sep. 1991.

* cited by examiner

OPTIMIZING SOFTWARE DISTRIBUTION IN LARGE COMMUNICATION NETWORKS

This application is the US national phase of international application PCT/NO02/00101 filed 12 Mar. 2002, which designated the US.

FIELD OF THE INVENTION

The present invention is related to optimizing software distribution in large communication networks and in particular to hosts, servers, gateways, switches, routers and other network devices in large data and telecommunication networks.

BACKGROUND

From time to time, the software running on network devices throughout the network needs to be updated to provide new features, correct known problems, or correct bugs. Typically, the vendor releases new revisions containing corrections quite frequently, while new versions that adds functionality to the network device is less frequently released.

Early in the life cycle of the product, where a large number of new features are introduced in every release, the rate of corrections may be very frequent. Problems that have not been discovered in vendor test labs will most likely surface during initial tests and operation in customer networks. One reason may be that the demand to get new features with increased speed to market, forces vendors to sacrifice extensive quality control. For this reason, it is essential for the vendor to deliver systems that may update customer networks with only minimal impact on network operation.

In addition, it is expected that the rollout of new features in the network will be more rapid in the future. In fact, this trend has already started, and third generation mobile telecommunication network (e.g. UMTS) is expected to boost this trend even further, especially in the mobile services area. This is because operators need to increase their revenue per customer, due to large 3G investments, in order to maintain their return on investment. This trend puts even more emphasis on the need for rapid update of features in customer networks, and clearly maintenance time needs to be minimized, since it has direct impact on operator revenue.

In most cases, software is distributed directly from the O&M center (OMC) to every network element that shall be upgraded. This means that the same software may be distributed to devices that are physically close in the network over the same physical transmission paths. Clearly, this is a waste of network bandwidth, since the same data must travel the same transmission path more than once. For the same reason, it is also clear that the distribution will take longer than necessary.

Both these factors are important, since the operator wants to use as little bandwidth as possible for maintenance traffic, and utilize as much as possible of the bandwidth for chargeable end-user traffic. It should be noted that maintenance traffic for telecom operators has traditionally been carried over a separate network, while this is generally not true for data communication carriers. However, the argument above is valid in both cases. Limiting the maintenance window is also important, since the operator needs to do distribution during periods of low traffic.

To illustrate the current situation, reference is made to the example network in FIG. 1. Today, when the operator has scheduled a distribution of software to devices D, F, and G, the software is often distributed in three different downloads from OMC to D, from OMC to F, and from OMC to G. One possible optimization would be to download first from OMC to C, from C to F, from C to D, and then from D to G.

In FIG. 1, the current solution is illustrated using filled circular symbols, while the optimized solution is illustrated using symbols with no fill. Each symbol represents a software package. The picture clearly illustrates how bandwidth is saved by optimization of the distribution.

The technical mechanisms to do distribution from one network device to another are well known and implemented in many modern network devices. If distribution is made using the Internet standard FTP protocol, it is simply a matter of implementing both an FTP client and server on the network device. Distribution between two network devices takes place using the FTP client on one of the devices to log on to the FTP server of the other and fetch the appropriate files.

One way of distributing software packages from one single node to a multiple of nodes in a network is described in "Multicast routing algorithms and protocols: A Tutorial", by Laxman H. Sahasrabuddhe and Biswanath Mukherjee, University of California published in IEEE Networks January/February 2000. The article describes multicasting, which provides the ability of a communication network to accept a single message from an application and to deliver copies of the message to multiple recipients at different locations. An efficient implementation of multicasting permits a better use of the available bandwidth y transmitting at most one copy of the software package on each link in the network. However, multicasting is demanding to configure and maintain, and the technology is not applicable in all types of networks. An example of this is X.25, which is a common standard for maintenance of telecommunication network. Besides, multicasting requires that multicasting logic is implemented in each of the involved nodes in the network.

Another way for the operator to save some bandwidth is by distributing the software on an ad hoc basis from device to device, i.e. manual distribution based on knowledge of the network, but the real benefits are only realized when there is an automated method available that can be used to plan the entire distribution throughout the network. In addition, the operator easily looses control of the distribution process using the ad hoc method, and it is difficult to apply in large networks.

Network devices may implement application functions like multimedia telephony or unified messaging, which provide additional value for the end-user beyond basic end-to-end connectivity. In traditional telecommunication networks, the number of different types of network devices has been quite small, because network functions spanning from transport to the application layer have been integrated in a single element.

However, following the convergence of data and telecom technologies, the number of different network device types is increasing. Ericsson and other vendors are dividing the next generation network into connectivity, control and application layers, with a large number of specialized network element types at each layer. The growing number of devices will demand more effective ways of distributing new software in the network.

The main object of the present invention is to provide a method for optimal distribution of software in a communication network, that overcomes the problems identified above.

SUMMARY

The technology described optimizes the distribution of software to nodes in a communication network from one distribution node. The communication network may be a telecommunication network, e.g. UMTS, and the distribution node may be an OMC in such a network.

Initially, a distribution graph is constructed including the above-mentioned nodes spanned out by logical links assigned cost values indicating the cost of transferring data between the associated adjacent nodes.

Then the shortest paths from the distribution node to the nodes in the distribution graph are calculated with respect to said costs.

The next step in the method is to identify overlapping paths and placing them in separate groups. Identifying paths are defined as paths starting at the same node, going through exactly the same path up to some point in the distribution graph.

Then the paths in each group are ordered according to the number of nodes included in each path. The path having the lowest number of nodes in the group is placed first, the path having the second lowest number is placed as the number two node, and so on.

Finally, for each group, the software is distributed from the distribution node to the rest of the nodes in the group starting by loading the software from the first node to the second node of the first ordered path. Then the software is loaded from the first node to the second node of the second ordered path, and so on up to the last path in the group. However, the loading between the same two nodes is not taking place more than once, even if they appear as the first and the second node in more than one path. After being through all the paths in the group, the first node in each path and each path in which only one node remains, are removed. These last loading and removing steps are then repeated until no further paths are left in the group.

In a preferred example embodiment, the distribution of the groups is executed in parallel. Also, the above described loading between the first and the second node of a path is executed in parallel for two or more paths within the same group if said two or more paths include the same number of nodes.

DETAILED DESCRIPTION

The technology makes use of a shortest path algorithm. There are several variants of this algorithm, but the most known is probably Dijkstra's algorithm [1]. This algorithm determines the shortest path from a start node to all other nodes in the network. The different shortest path algorithms differ in complexity, but this is not important for the purpose of the method described here.

The shortest path algorithm is used to calculate the shortest path from a distribution node, hereafter exemplified as an OMC in a telecommunication network, to at least each node to which corrected or new software shall be distributed. These nodes are included in a distribution list. Note that this list also may include one or more nodes to which the new software not is to be distributed. However, the inclusion of such nodes assumes that they are centrally localized relative to the other nodes, and that it is stated that the inclusion implies a more effective software distribution when utilizing the method according to the present invention. Generally, though, only the nodes to which corrected or new software is to be distributed will be included in the distribution list. Then the method described in detail below is used to optimize distribution from the OMC to each node. The distribution itself is executed using some file transfer mechanism, e.g. the File Transfer Protocol [2].

Construct Distribution Graph

Figure 2:
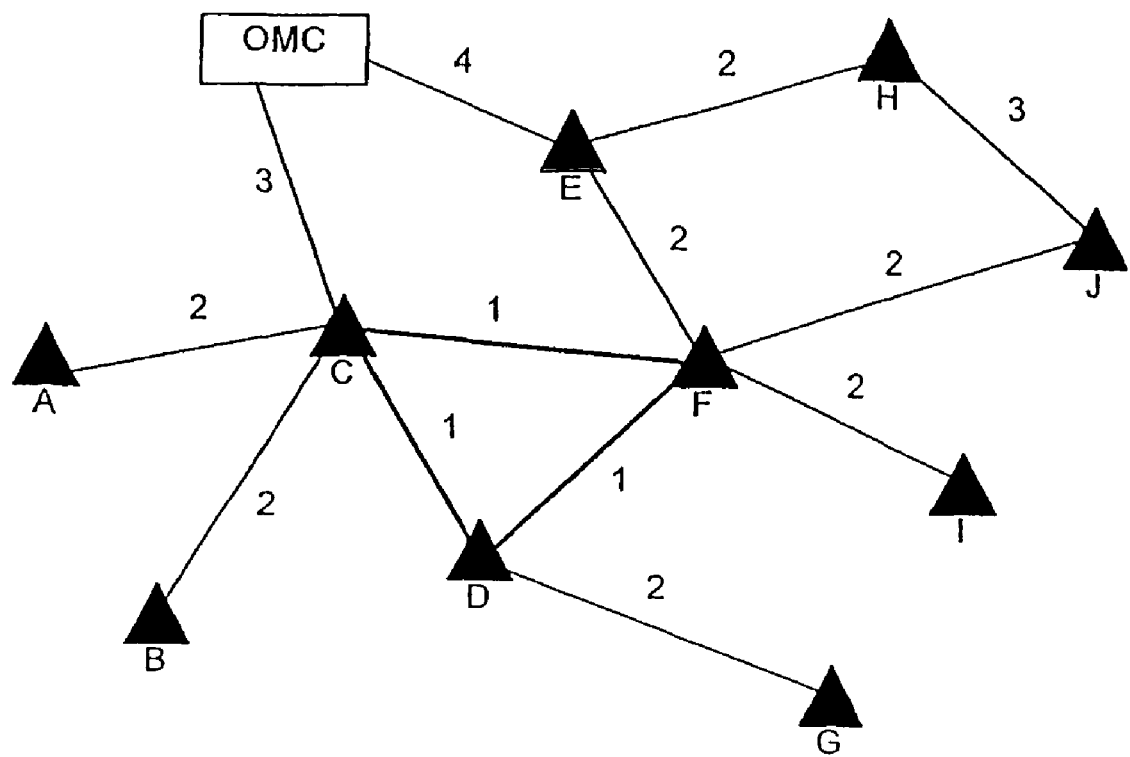
FIG. 2 shows a distribution graph including all nodes involved in the distribution spanned out by logical transfer links each assigned a cost.

In order to calculate the shortest paths from the OMC to every network device that are included in the distribution, what is referred to as a distribution graph is constructed. This distribution graph contains the OMC and the nodes that are included in the distribution. The nodes are spanned out by the logical transfer paths that are set up between the nodes, which are referred to as edges in the graph. In addition, the cost of each edge is included in the graph. FIG. 2 illustrates a typical distribution graph.

It should be noted that the actual transfer of data from device OMC to C, might physically go through both devices I1 and I2, but these nodes are excluded from the distribution graph. This is because these nodes are not part of the distribution, and therefore not relevant in the shortest path calculation. The logical cost of transferring data from OMC to device C is the sum of all intermediate physical transmission paths, i.e. in this specific case the sum of transferring from OMC to I1, from I1 to I2, and from I2 to C.

What measure to use for the cost between two neighboring devices, depends on the network at hand. However, using the bandwidth (in bits per second) times the delay (in seconds) should be widely applicable. The measure that is used is not important for the purpose of this method, as long as a cost is associated with every logical path in the network. If the cost is impossible to determine, use of cost per unit (i.e. 1) to minimize the number of hops may be useful.

Upon completion of this step, you should have a distribution graph consisting of the devices to which software should be distributed, and the cost of transferring data between each neighboring node, commonly referred to as edge is cost. FIG. 2 illustrates such a distribution network. Note that only two of the participating devices have "direct" paths to the OMC. With "direct", it is understood that there may be devices not participating in the distribution between the OMC and the "directly" connected device.

Calculate Shortest Paths

The distribution graph is used as input to this step, which involves calculating the shortest path from the OMC to every device that is included in the distribution. As mentioned earlier the calculation is performed using a shortest path algorithm. The recommended algorithm is Dijkstra's [1], which will produce the shortest path to every node in the distribution network starting from the OMC.

The detailed working of Dijkstra's algorithm is not included here, but a good description may be found in [2].

The output of the algorithm is a set of paths, where each paths starts with the OMC and ends with one of the devices in the network. For instance, in FIG. 2, the following is the shortest path: OMC, C, D, G. This means that if software is to be distributed from the OMC to device G, it should first be transferred from OMC to C, then from C to D, and finally from D to G.

It should be noted that routing in the Internet uses the Open Shortest Path First (OSPF) protocol, which uses an edge cost between routers in the network in order to determine the route between source and destination hosts. However, OSPF routing operates only between a source and destination host, and hence it cannot be used to optimize transfer to a set of hosts. On the other hand, OSPF will help us optimize the transmission between two neighboring devices in the logical network that are connected through an intermediate physical network.

Identify Overlapping Paths

The next step is to identify overlapping paths from the shortest path calculation. Two paths are overlapping if they start at the same node, and go through exactly the same path up to some point. This means that one of the paths overlaps parts of the other. In addition, a path always consists of two or more nodes, and in our case, all paths start at the same node, i.e. the OMC. In other words, two paths are overlapping if they have a common root path.

The following example illustrates the concept of overlapping paths, given the shortest paths as output from the previous step. The nodes and paths used may be identified in FIG. 2.

OMC, C
OMC, C, D
OMC, C, F
OMC, C, D, G

These paths are overlapping in terms of the above definition. This means that they all start at the same node, which in this case is the OMC. In addition, all four paths go through exactly the same nodes, in the same order up to a certain point, where they separate, i.e. OMC and C.

The output of this step is a grouping of paths into sets of overlapping paths. The grouping must contain a root path, which is a path that all the other paths are overlapping. Since the distribution graph only contains nodes that are included in the distribution, the root paths will only contain two nodes. In the example above OMC, C is a root path.

According to the present invention, the following procedure may be used to build the groups of overlapping paths:

Create a new set of paths for each root path, or in other words, create a new set of paths for each path that contains only two nodes.

When there are no more root paths left, traverse through the rest of the paths and group each path together with their root path. In other words, for each remaining path, check the two first nodes in the path and place the path into the group that has the same two first nodes.

In the example above, OMC, C is a root path, and the three following paths are grouped together with this path. They all belong to the same group, because of the common two first nodes OMC and C.

According to the procedure disclosed above, the number of sets of paths is equal to the number of logical links leaving the OMC.

Order Overlapping Paths

The next step is to order each set of overlapping paths identified in the previous step. The ordering is simple and based on the number of nodes in the path. The path with the least number of nodes, which is always the root path that has only two nodes, gets the first order. The last order is given to the path having the largest number of nodes. If more than one path has the same number of nodes, the ordering of these nodes does not affect the operation of this method.

Execute Distribution

The execution of the software distribution follows the grouping and ordering of overlapping paths. The execution of the distribution is done per group, which means that is software may be distributed to different groups in parallel. Within each group, the distribution along overlapping paths must be performed sequentially according to the ordering of group, except for the paths having the same length, which might be distributed in parallel.

The latter is because; the distribution is executed in a breath-first manner. However, it is still possible to distribute the software to several nodes that are one hop away in parallel. Given the example in FIG. 2, this means that it is possible to distribute software from C to both D and F in parallel, while G has to wait for the software to be installed on D.

The execution starts with the path having the first order and proceeds until the path with the final order is reached. When software distribution is executed along a path, all nodes except the last node in this path are removed from all other paths. The ordering is not changed during this operation, and the execution continues with the next path in order until the final path in the order is reached.

Given the example from the section "Identify Overlapping Paths", the execution will start with distribution from OMC to C. Then the OMC node will be removed from all paths, leaving the following paths to be executed:

C, D
C, F
C, D, G

At this point, C to D and C to F may be executed in parallel. Then, C is removed from the latter path. Finally, software is distributed from D to G, which completes the distribution.

As described previously, the actual file transfer between two neighboring nodes in the distribution graph may be implemented using Internet FTP. However, there is a number of less frequently used file transfer protocols that may also be employed, e.g. the OSI FTAM protocol and vendor proprietary protocols.

The implementation with FTP assumes that there is both an FTP client and server running on each network device in the distribution list. On the OMC, at least an FTP client needs to be installed. In addition, there has to be some mechanism to remotely initiate an FTP transfer between to neighboring nodes in the network from the OMC. A convenient and widely used mechanism is the telnet protocol, which enables logging in from the OMC to a network device, and initiating a transfer to another device using the FTP client. This puts additional requirements on each network device in the distribution list to have a telnet server running, and a telnet client to be installed on the OMC.

The execution starts with the root path. The FTP client on the OMC is used to transfer the software (using the put command) to the FTP server on the first network device, which is device C in the example above. The next use-case is to transfer software between two devices in the network, e.g. between C and D in the example above. This is executed from the OMC by "telneting" into node C, and initiating an FTP transfer from C to D (again using the put command). In both cases, nodes C and D must have an FTP server running.

An EXAMPLE EMBODIMENT OF THE PRESENT INVENTION

Figure 3:
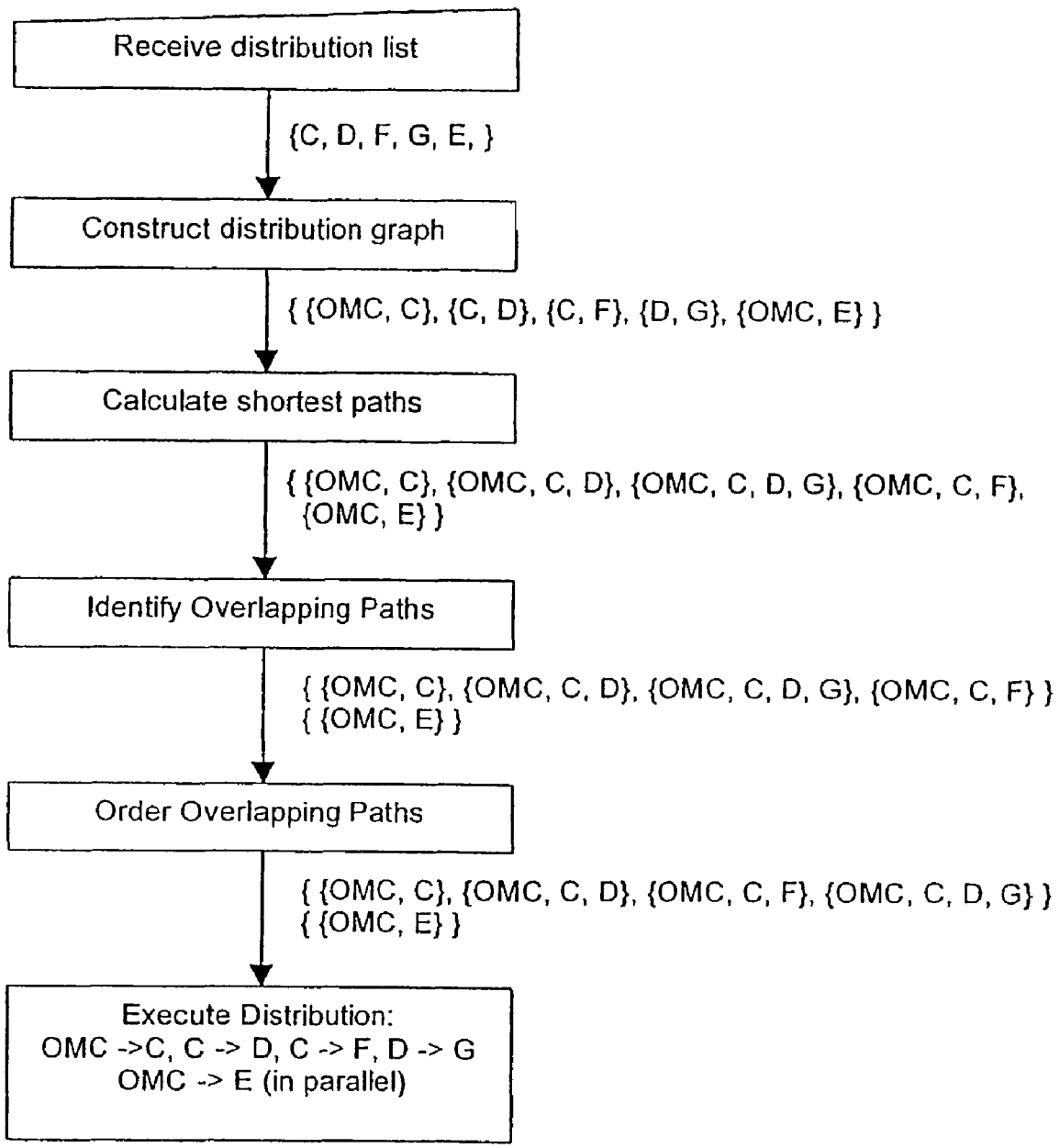
FIG. 3 is a flow chart illustrating the steps of the software distribution procedure according to an example embodiment.

FIG. 3 presents an example embodiment The distribution starts by receiving the nodes where software shall be installed, i.e. nodes C, D, E, F, and G in this example.

The next step in the method is to construct the distribution graph. This requires knowledge about the structure of the physical nodes in the network. In addition, the cost of transferring data between two adjacent nodes in the network must be known. How to construct the graph is very dependent on which type of network technology is being used through-out the network.

In this example, we assume an IP-based network running the OSPF routing protocol [4]. OSPF is a link-state protocol that advertises all of its neighbors. Based on this information, every router in the network builds a directed graph of the entire network (in fact using Dijkstra's algorithm).

From the OSPF protocol, we may induce the distribution graph by retrieving the shortest path between every pair of nodes including the OMC. All intermediate nodes in the resulting graph are removed, while the edge costs between two adjacent nodes is preserved. The edges of the distribution graph are shown as output from the "construct distribution graph" step in FIG. 3.

Figure 4:
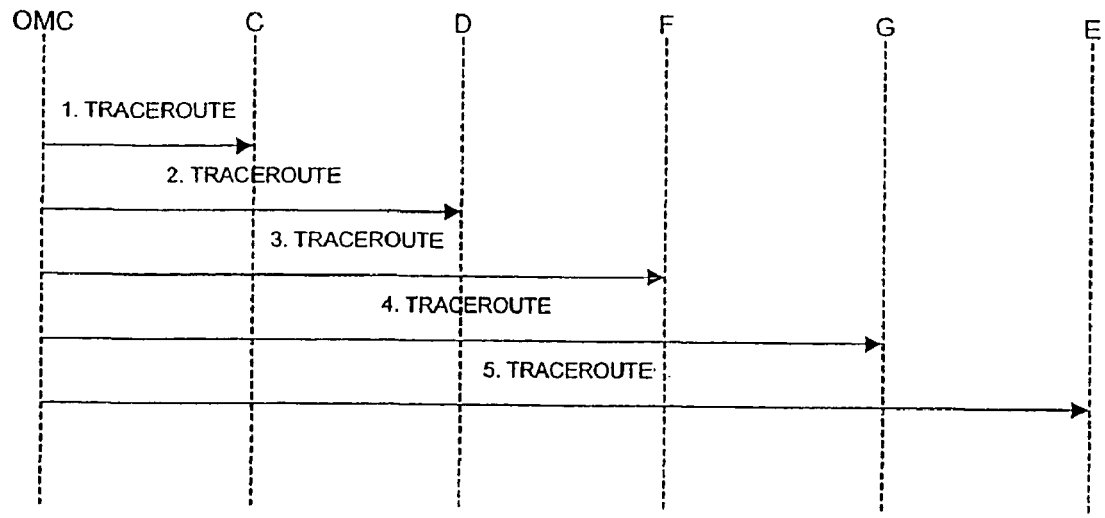
FIG. 4 is a sequence chart illustrating the trace route procedure used in an example embodiment for constructing the distribution graph of FIG. 3.

In practice, the distribution graph may be constructed by using the traceroute utility found on most UNIX systems, but similar utilities may also be found on other platforms. Traceroute makes use of the Internet Control Message Protocol (ICMP) [5]. FIG. 4 illustrates the traceroute command being issued from the OMC towards every node that takes part in the distribution. An example output from the traceroute command is given below.

```
> traceroute G
traceroute to G (192.168.137.240), 30 hops max, 40 byte packets
 1 I1  (192.168.244.1)    2.155 ms    1.145 ms    1.206 ms
 2 I2  (192.168.37.37)    2.796 ms    1.375 ms    2.113 ms
 3 C   (192.168.37.33)   24.255 ms   23.121 ms   26.688 ms
 4 I3  (192.168.1.108)   24.968 ms   31.161 ms   28.039 ms
 5 D   (192.168.1.10)    24.439 ms   25.542 ms   26.647 ms
 6 I4  (192.168.1.74)    25.892 ms   25.793 ms   30.225 ms
 7 I5  (192.168.1.15)    28.170 ms   37.293 ms   33.249 ms
 8 G3  (192.168.137.240) 37.508 ms   25.684 ms   25.284 ms
```

The example above shows that there is a link between OMC and C, and that the shortest link goes through the intermediate nodes I1 and I2. The round-trip delay given by the traceroute command may also be used as edge cost. Based on the output of this command, the following edges are added to the distribution graph: OMC to C, C to D, and D to G. Based on the output from the rest of the traceroute commands, the entire distribution graph may be constructed. Please note that intermediate nodes are not included in the graph.

Again, it is important to note that the construction of the distribution graph is specific to each network technology, and will be different for a network that uses static routing. What is important is that the output of this step is a distribution graph that contains only the nodes involved in the distribution, and the cost of transferring data between to adjacent nodes in the graph. Note that the distribution graph in packet-based networks may vary in time as the load over the communication links varies. Thus, the construction of the distribution graph should take place immediately be-fore the actual distribution.

The next step is to use the distribution graph to calculate the shortest paths from the OMC to every node in the distribution graph. This is an application of Dijkastra's algorithm on the edges of the distribution graph. Every edge also has an associated cost that is used by the algorithm, but this is not shown in the figure. The resulting set of shortest paths using the OMC as a source node is shown as output from the "calculate shortest path" step.

The next step is to identify overlapping paths from the previous step, i.e. paths that have the same root path. In this case, there are two groups of overlapping paths, i.e. the group starting with the root path {OMC, C} and the group consisting only of the root path {OMC, E}. The grouping into sets of overlapping paths is shown as output from the "identify overlapping paths" step.

After the overlapping paths have been identified, they must be ordered. This is a simple ordering of the paths based on the length of each path (i.e. the number of nodes). The ordering is performed per group of paths, and each resulting ordered group should start with the root path. The output of the "order overlapping paths" step is shown in FIG. 3.

The final step is to execute the distribution of software. The two groups of ordered overlapping paths is the input. Each grouping is executed in parallel, which means that an FTP transfer from OMC to C and to E is started in parallel. When the transfer to node E is completed, there are no more paths in this grouping, and hence the execution ends. However, the execution of the other grouping continues with a transfer from C to D and from C to F in parallel. Then, finally, a transfer of the software from D to G is executed.

Figure 5:
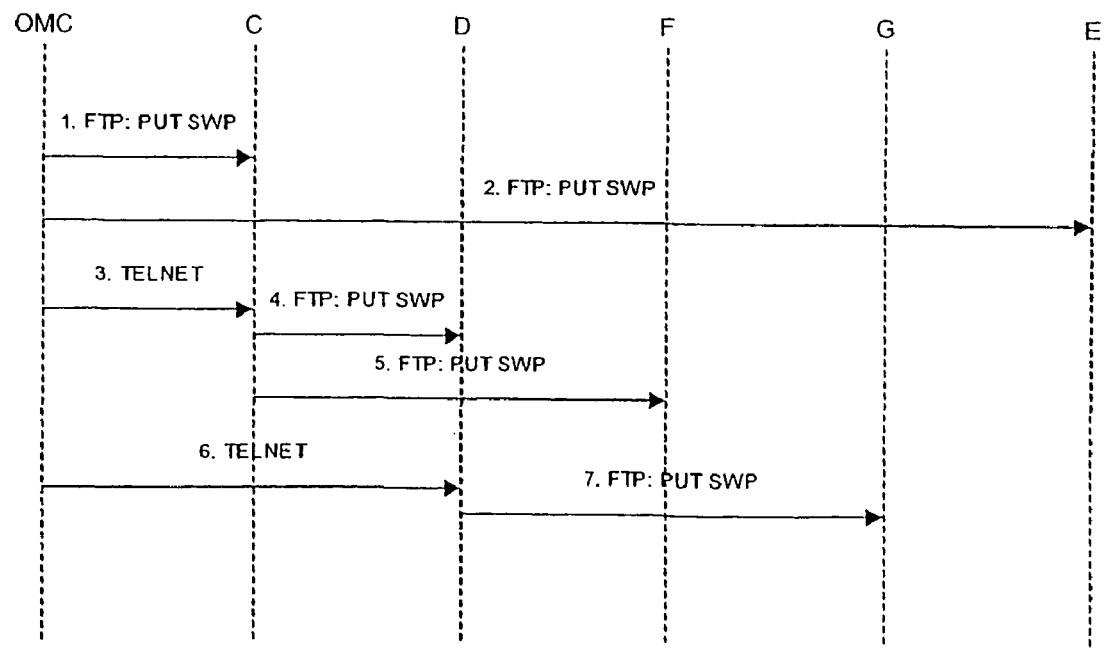
FIG. 5 is a sequence chart illustrating the use of TELNET and FTP for loading SWPs from one node to another in an example embodiment.

FIG. 5 presents a sequence chart that includes the messages required to perform the distribution described textually above. In the figure, the OMC and the network devices that take part in this distribution is shown at the top. A "TELNET" message means remote logging in from the OMC to a network device. An "FTP: PUT SWP" message means that an FTP client is started locally, and that the PUT command is used to transfer the SW Package (SWP) to the remote location.

An advantage with the present invention is that it will optimize the transfer of software to a group of network devices. This will enable the operator to distribute software to a large number of network devices with reduced bandwidth consumption compared to the current solution. The effect on operator business is that more customer traffic may flow through the network also during maintenance periods, i.e. less bandwidth has to be allocated for management traffic.

Figure 1:
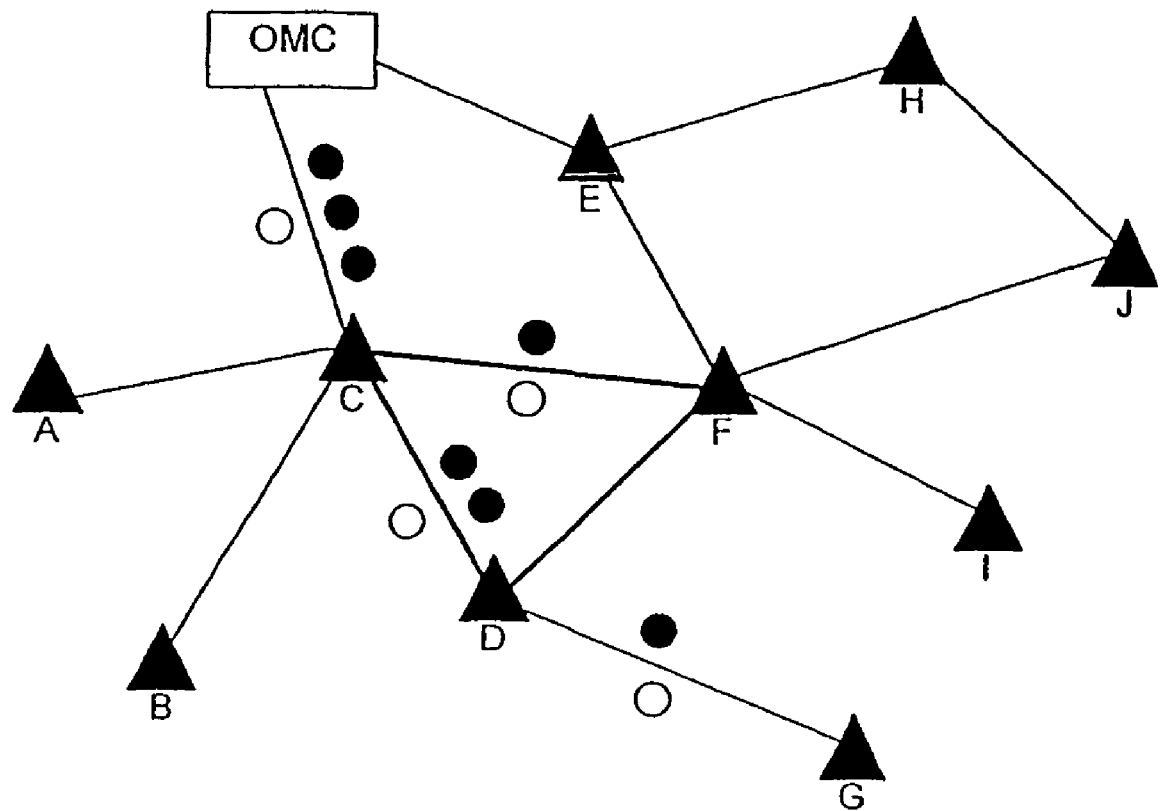
FIG. 1 shows a distribution graph illustrating an example of how software distribution may be executed in a telecommunication network today.

Given the example in FIG. 1, where the current solution is shown using filled circles and the optimized method is shown using circles with no fill. This example demonstrates a 75% decrease in bandwidth consumption. Clearly, the amount of bandwidth saved using this method is highly dependent on the number of overlapping paths. However, in a typical telecommunication network, the number of overlapping paths will be quite high, e.g. a GSM Base Station Controller (BSC) has more than a hundred directly connected Radio Base Stations (RBS). Even if the BSC shall not have the same software as the RBSs, nevertheless, it may be included in the distribution list for a maximum utilization of the method according to the present invention.

Since the bandwidth requirements are reduced, the operator will also be able to distribute software to more network devices at the same time. Currently, when software is distributed to a large number of network devices, this has to be done at least partly sequentially. This is because a parallel distribution to all devices would place too much stress on the management network.

Another advantage of the present invention is that the time consumption for the entire operation will be slightly smaller, since the file transfer is not performed directly from the OMC to every device. Instead, the file transfer sessions are set up between neighboring nodes in the network. The method of the present invention will automatically distribute the software in sequential order, or, in case of non-overlapping paths, also in parallel. However, to the operator, the distribution will appear to be parallel to all nodes included in the distribution list.

The technology described is intended for software distribution to network devices, which may be seen as special-purpose computers for use in communication networks. However, there is nothing stopping it from being applied for software distribution to general-purpose computers. In fact, network elements that realize application functions like unified messaging in next generation networks will be general-purpose computers. In addition, one might imagine that even the user terminals in future telecommunication networks like the MSs in UMTS will have software upgrades automatically executed from the network.

Consequently, other implementations and variations other than the ones described here may be utilized without departing from the scope of the invention as defined in the following claims.

| Abbreviations | |
| --- | --- |
| FTP | File Transfer Protocol |
| ISP | Internet Service Provider |
| O&M | Operation and Maintenance |
| OMC | Operation and Maintenance Center |
| OSPD | Overlapping Shortest Path Distribution |
| OSPF | Open Shortest Path First |
| SW | Software |
| SW | SW Package |

REFERENCES

[1] E. W. Dijkstra. "A note on two problems in connection with graphs." Numerische Mathematik, 1-269-271, 1959
[2] T. H. Cormen, C. E. Leiserson, R. L. Rivest. "Introduction to Algorithms." The MIT Press, 1989
[3] J. Postel, J. K. Reynolds. RFC0959 File Transfer Protocol, Updated by RFC2228 and RFC2640, October 1985
[4] J. Moy. RFC2328 OSPF Version 2, April 1998
[5] S. Deering. RFC1256 ICMP Router Discovery Messages, September 1991

The invention claimed is:

1. A method in a communication network including a set of nodes to which software is to be distributed from a distribution node, comprising:
  receiving a distribution list of nodes including at least said set of nodes,
  generating, on the basis of knowledge of a structure and a current load in the communication network, a distribution graph including the nodes of the distribution list together with the distribution node with logical communication links between adjacent nodes, wherein each of said communication links is assigned a cost value corresponding to the cost associated with data transmission over the respective logical communication link,
  calculating and storing the shortest path in the distribution graph from the distribution node to each node of the distribution list, respectively,
  identifying overlapping paths among the stored shortest paths, wherein overlapping paths are paths having a common path from the distribution node up to a certain node of the distribution list, and then grouping together overlapping paths,
  ordering the paths of each group according to the number of nodes included in each path, respectively, wherein the path having a lowest number of nodes in a group is placed first in that group, and the path having a highest number of nodes in a group is placed last in that group,
  for each group, executing distribution of the software from the distribution node to each node in the respective group by the following software distributing steps:
  loading the software from the first to the second node of each path in the group, starting with the first path and successively proceeding to the last node, wherein the loading between the same two nodes does not take place more than once,
  removing the first node of each path in the group so that the second node (if any) becomes the first node, the third node (if any) becomes the second node, and so on,
  removing the paths having only one node left, and
  if no paths are left in the group, stopping the distribution of the software for this group, otherwise repeating the software distributing steps.

2. A method according to claim 1, wherein the distribution of the software in two or more of said groups is executed in parallel.

3. A method according to claim 1, wherein said loading between the first and the second node is executed in parallel for two or more paths within the same group if said two or more paths include the same number of nodes.

4. A method according to claim 1, wherein the cost value for a logical link is defined as the bandwidth of the logical link times the delay in the logical link.

5. A method according to claim 1, wherein the step of generating the distribution graph is executed by a traceroute utility found in the UNIX system whereby all intermediate nodes between nodes of the distribution list including the distribution node are removed without affecting the cost value.

6. A method according to claim 1, wherein the step of calculating and storing the shortest paths is executed using Dijkastra's algorithm.

7. A method according to claim 1, wherein said loading of software is carried out using FTP.

8. A method according to claim 7, wherein a further step prior to the step of loading the software comprises:
  remotely logging in to said first node from the distribution node by means of the TELNET protocol when said first node is not the distribution node.

9. A method according to claim 1, wherein said communication network is an IP network.

10. A method according to claim 1, wherein said distribution node is an OMC node.

11. A method according to claim 10, wherein the communication network is a mobile telephone network, and the set of nodes includes controlling nodes and/or supporting nodes and/or mobile stations.

* * * * *

UNITED STATES PATENT AND TRADEMARK OFFICE
CERTIFICATE OF CORRECTION

PATENT NO. : 7,420,923 B2
APPLICATION NO. : 10/471416
DATED : September 2, 2008
INVENTOR(S) : Helgesen It is certified that error appears in the above-identified patent and that said Letters Patent is hereby corrected as shown below:

In Column 4, Line 49, after "edge" delete "is".

In Column 4, Line 60, delete "Diikstra's" and insert -- Dijkstra's --, therefor.

In Column 6, Line 7, after "that" delete "is".

In Column 6, Lines 63-64, delete "An EXAMPLE EMBODIMENT OF THE PRESENT INVENTION".

In Column 6, Line 65, delete "embodiment" and insert -- embodiment. --, therefor.

In Column 7, Line 6, delete "through-out" and insert -- throughout --, therefor.

In Column 7, Line 59, delete "be-fore" and insert -- before --, therefor.

In Column 7, Line 62, delete "Dijkastra's" and insert -- Dijkstra's --, therefor.

In Column 10, Line 42, in Claim 6, delete "Dijkastra's" and insert -- Dijkstra's --, therefor.

Signed and Sealed this

Twenty-fourth Day of March, 2009

JOHN DOLL
*Acting Director of the United States Patent and Trademark Office*